June 12, 1923.

A. E. OSBORN 1,458,496

CRANK SHAFT DIFFERENTIAL GEAR

Filed Dec. 16, 1920  2 Sheets-Sheet 1

Inventor
Alden E. Osborn.

June 12, 1923.

A. E. OSBORN

CRANK SHAFT DIFFERENTIAL GEAR

Filed Dec. 16, 1920 2 Sheets-Sheet 2

1,458,496

Inventor
Alden E. Osborn

Patented June 12, 1923.

1,458,496

UNITED STATES PATENT OFFICE.

ALDEN E. OSBORN, OF NEW YORK, N. Y.

CRANK-SHAFT DIFFERENTIAL GEAR.

Application filed December 16, 1920. Serial No. 431,157.

*To all whom it may concern:*

Be it known that I, ALDEN E. OSBORN, a citizen of the United States of America, and a resident of New York, county of the Bronx, and State of New York, have invented certain new and useful Improvements in a Crank-Shaft Differential Gear, of which the following is a specification.

This invention relates particularly to a method of combining the differential or compensating gear of motor vehicles with the crank shaft of the motor or engine thereof in such a way that, while the drive may be taken directly from both ends of said crank shaft to the traction wheels, each of said wheels can turn independently of the other thru the action of said differential gear when the vehicle is rounding a curve. Thus all gearing between the engine crank and traction wheels can be eliminated with the result that not only is the cost, weight and frictional loss directly reduced but by reason of these direct gains the cost and weight of the entire power plant may be lowered while yet the same results are obtained from it as are obtained from a larger and more expensive plant arranged in the usual way. It is obvious that this invention is particularly suited for use in connection with steam propelled vehicles but is not necessarily limited to use with that type of vehicle as other motive powers may be employed provided they permit a combined crank shaft and differential to be used to advantage. It should also be understood that while my invention has the special advantage of eliminating all gearing between the engine and traction wheels, as stated above, it is not essential where a reduction is desired, because of a slow vehicle speed or other causes, that the drive from each side of my crank shaft be taken directly to the wheels as it is perfectly obvious that, in such cases, sprockets or gear wheels may be substituted for the direct mounted traction wheels and these sprockets or gear wheels connected to the traction wheels to transmit their rotation to them at any speed ratio desired. Another feature of my invention is in the method of transmitting the rotation of the crank shaft or differential carrier, when mounted on the axle of the vehicle, to the auxiliary apparatus which I prefer to have mounted on the spring supported framing thereof.

In the accompanying drawings I have, for the purposes of disclosure, illustrated my invention in one form only but I would have it understood that it is susceptible of embodiment in other forms without departure from the true spirit and scope of the invention as defined in the appended claims. In these drawings:

Figure 1:
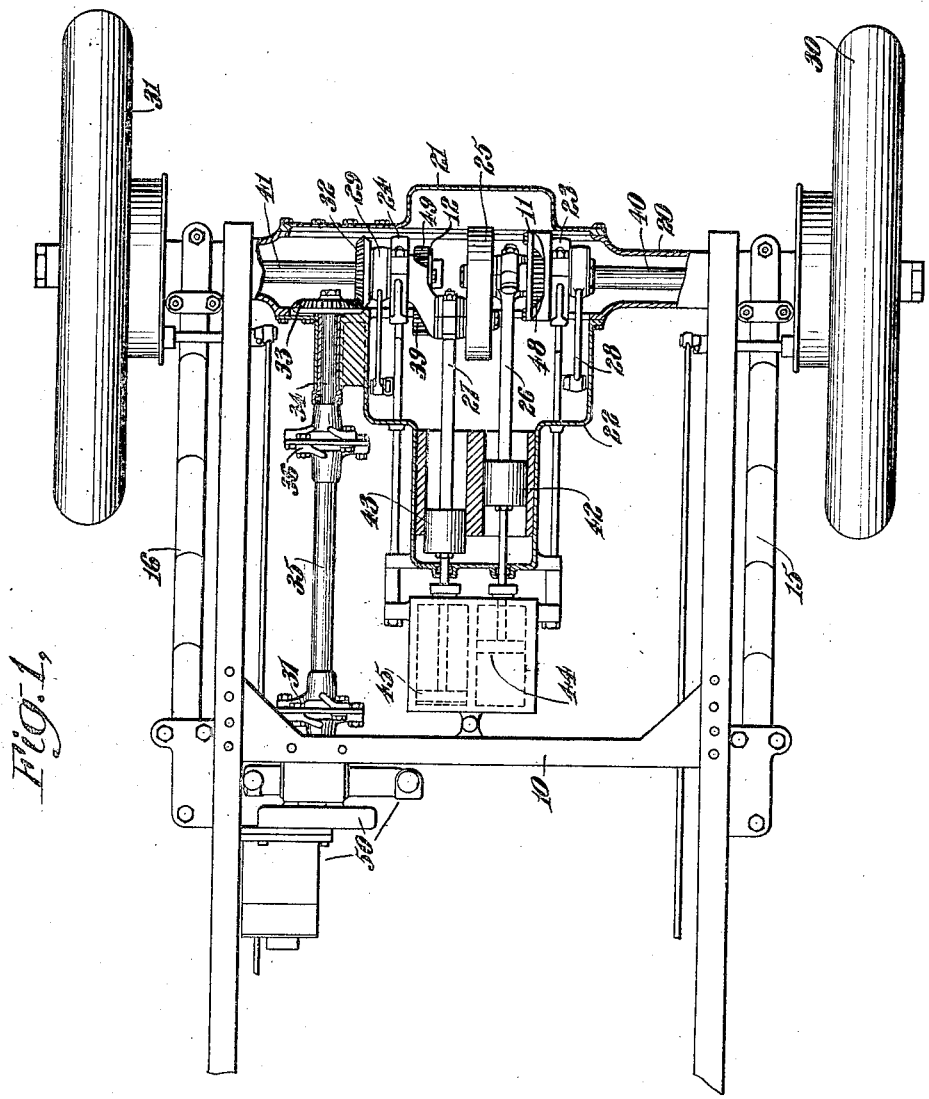
Figure 1 represents a partial sectional plan view showing the rear portion of a motor vehicle containing the features of my invention.

Referring to Figure 1, 10 indicates the main frame of the vehicle, 15 and 16 indicate the supporting springs by which the frame is connected to the axle casing 20, 30 and 31 indicate the traction wheels which are mounted on the axle casing. The axle casing 20 is shown as of the banjo type or type continuous from wheel to wheel with a forward opening in its center for while it is not essential to my invention that this form of axle be used, I prefer this type because it allows the engine casing 22 to be bolted against one of its sides in such a way that the complete engine mechanism can be removed as a unit from the axle by releasing these bolts and withdrawing the driving shafts 40 and 41 which transmit the power to the traction wheels. The opening in the side of the axle casing opposite that to which the engine casing 22 is bolted is closed by a readily detachable cover 21 so that the internal parts of the mechanism can be easily inspected when it is removed. The engine casing 22 is provided with suitable bearing supports 23 and 24 in which are mounted the bearings for the crank shaft 25 which is shown as provided with two crank pins at 90° on which the connecting rods 26 and 27 have their bearings.

This crank shaft is hollow and is provided with suitable sockets or openings in which the gears of the differential gear system (to be described later) are mounted.

The shaft is also shown as provided with suitable eccentrics for operating the connecting rods 28 and 29 of the engine valve gear which is not shown in detail as it may be of any type desired. Should this valve gear be of the Stephenson link type double eccentrics and rods would, of course, be provided to actuate the valve of each engine cylinder instead of the single eccentric shown. In order to drive the various auxiliary apparatus I have shown a bevel gear 32 attached to one end of the crank shaft which gear meshes with a gear 33 on the shaft 34. As I prefer that this auxiliary apparatus, which may consist of the water pump, fuel pump, lubricating pump, air pump, electric generator and speed indicator, be supported by the springs I have shown it mounted on the vehicle frame 10 and indicated by the figure of reference 50. The drive is transmitted from the shaft 34 to the auxiliary apparatus by means of the shaft 35 and universal or flexible joints 36 and 37. The remaining parts shown in this figure do not require special mention as they will be readily understood by those skilled in the art. I would point out, however, that it is not necessary to limit the use of my invention to operation in connection with the type of engine shown, in which cross heads 42 and 43 and pistons 44 and 45 are used, as trunk pistons may be used with a three cylinder engine and three throw crank or with four cylinders and the two throw crank shown—the cylinders being arranged with two at 90° to the other two in the well known manner in order to make the engine self starting.

Figures 2, 3:
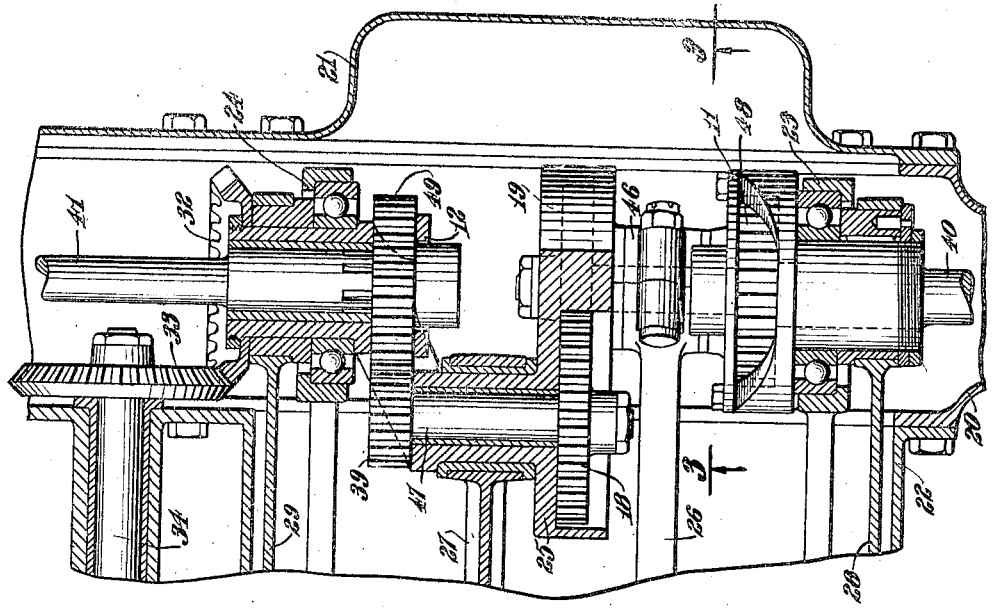
Figure 2 represents a sectional plan view of crank shaft and differential gear mechanism shown in Figure 1.
Figure 3 represents a vertical section of Figure 2 taken on the line 3—3.

I will now refer particularly to Figures 2 and 3 and describe more in detail the construction of the differential gearing and crank shaft. The crank shaft 25 is, as before stated, hollow and these holes are shown as bushed to provide bearings for each of the drive shafts 40 and 41 and for the intermediate differential shafts 46 and 47 which pass thru the crank pins. The differential gearing comprises six gears in all—two of which 48 and 49 are mounted on the drive shafts 40 and 41 and mesh with two pinion gears 38 and 39 on the shafts 46 and 47 and the two remaining gears 18 and 19 which are also mounted on these shafts and mesh together. Thus it will be seen, when the motions of these gears are considered, that, if the crank shaft is held from rotating, and one of the drive shafts turned, the other drive shaft would be rotated at the same speed but in a reverse direction in exactly the same way as is the case when the ordinary differential gear is employed, while if the crank shaft is revolved and one drive shaft held from turning the other drive shaft would be turned in the same direction as the crank shaft but at a higher speed in exactly the same manner as with the ordinary differential gear. In modifying this differential gear system so that it can be used with a three cylinder engine it is necessary to add another crank pin shaft for the added crank throw, two additional gears (similar to the gears 18 and 19) and an intermediate intermeshing pinion somewhere in the gear train so that the drive shafts 40 and 41 would turn in opposite derections when the crank shaft is held from rotating as this is all that is necessary to give the required compensating action. A four throw four cylinder crank shaft would not, however, require an intermediate intermeshing pinion to be used, as like the two throw shaft I have illustrated, the gear system required to connect up the two drive shafts 40 and 41 would rotate the shafts in the proper directions. In order to prevent the displacement of the shafts 48 and 49 I have provided two plates 11 and 12 which are bolted to the crank webs and surround the hubs of the gear holding them in position when the drive shafts 40 and 41 are removed. Should it be preferred to pin the gears to the drive shafts and thus keep them in position these plates 11 and 12 may be omitted.

Having thus described my invention, I claim as new and desire to secure by Letters Patent—

1. In a motor vehicle the combination of two traction wheels, a hollow supporting member carrying said wheels adjacent to each of its ends, and carrying the propelling engine of the vehicle, springs connected to said hollow supporting member and supporting the framing of the vehicle and an auxiliary apparatus carried by said vehicle framing and means for driving said auxiliary apparatus from the propelling engine of the vehicle on said supporting member while yet said supporting member and framing move relatively to each other under the action of said supporting springs.

2. In a motor vehicle the combination of a frame, two traction wheels, a hollow supporting member carrying said wheels adjacent to each of its ends and carrying the propelling engine of the vehicle, springs connected to said hollow supporting member and supporting said frame, an auxiliary apparatus carried by said frame, and having a rotary actuating shaft, a shaft carried by said hollow supporting member and geared to said propelling engine, an intermediate shaft, a universal joint connecting said intermediate shaft and said shaft carried by the supporting member, and a universal joint connecting said intermediate shaft and said rotary actuating shaft of the auxiliary apparatus.

3. In a motor vehicle, a combination of a frame, two traction wheels, a supporting member carrying said wheels adjacent to its ends and carrying the propelling engine of the vehicle, springs between said supporting member and said frame and supporting said frame, a pump carried by said frame, means for actuating said pump from said propelling engine comprising an intermediate shaft, and a universal joint at each end of said shaft between said shaft and said propelling engine and between said shaft and said pump to allow the movement of said frame in relation to the axle under the action of said supporting springs.

In witness whereof, I have hereunto set my hand this 9th day of December, 1920.

ALDEN E. OSBORN.